(12) United States Patent
Höfig et al.

(10) Patent No.: US 12,487,591 B2
(45) Date of Patent: Dec. 2, 2025

(54) RING-CLOSURES IN FAULT TREES AND NORMALIZED REPRESENTATION

(71) Applicant: Siemens Industry Software NV, Leuven (BE)

(72) Inventors: Kai Höfig, Rohrdorf (DE); Francesco Montrone, Riemerling (DE); Stefan Rothbauer, Augsburg (DE); Marc Zeller, Munich (DE)

(73) Assignee: Siemens Industry Software NV, Leuven (BE)

( * ) Notice: Subject to any disclaimer, the term of this patent is extended or adjusted under 35 U.S.C. 154(b) by 400 days.

(21) Appl. No.: 17/621,341

(22) PCT Filed: Jul. 10, 2020

(86) PCT No.: PCT/EP2020/069537
§ 371 (c)(1),
(2) Date: Dec. 21, 2021

(87) PCT Pub. No.: WO2021/009039
PCT Pub. Date: Jan. 21, 2021

(65) Prior Publication Data
US 2022/0413479 A1    Dec. 29, 2022

(30) Foreign Application Priority Data
Jul. 12, 2019  (EP) .................................. 19185911

(51) Int. Cl.
*G05B 23/02*    (2006.01)
(52) U.S. Cl.
CPC ............................. *G05B 23/0248* (2013.01)

(58) Field of Classification Search
CPC ..................... G05B 23/0248; G05B 23/0245
See application file for complete search history.

(56) References Cited

U.S. PATENT DOCUMENTS

| 5,014,220 A | * | 5/1991 | McMann | ............... G06F 11/008 |
| | | | | 706/45 |
| 2007/0011113 A1 | | 1/2007 | Mosleh et al. | |
| 2008/0255682 A1 | | 10/2008 | Zhao et al. | |

(Continued)

FOREIGN PATENT DOCUMENTS

| CN | 101657766 A | 2/2010 |
| CN | 104879295 A | 9/2015 |

(Continued)

OTHER PUBLICATIONS

Kai Höfig, Joe Zhensheng Guo, and Amir Kazeminia. "Streamlining architectures for integrated safety analysis using design structure matrices (dsms)", Safety and Reliability: Methodology and Applications, 2014.

(Continued)

*Primary Examiner* — Manuel L Barbee
(74) *Attorney, Agent, or Firm* — Schmeiser, Olsen & Watts, LLP (57) ABSTRACT

One or more ring closures of a fault tree are provided. For each one of the one or more ring closures: at least one respective edge the respective ring closure is replaced in the fault tree by a respective variable to obtain a placeholder fault tree and a normalized representation of the placeholder fault tree is determined.

7 Claims, 4 Drawing Sheets

(56) References Cited

U.S. PATENT DOCUMENTS

| | | | | |
|---|---|---|---|---|
| 2015/0088476 A1* | 3/2015 | Guo | .................. | G06F 30/20 |
| | | | | 703/6 |
| 2016/0299975 A1* | 10/2016 | Acar | ................ | G06F 16/24569 |
| 2018/0356810 A1* | 12/2018 | Höfig | .................. | G06F 30/33 |

FOREIGN PATENT DOCUMENTS

| | | | | |
|---|---|---|---|---|
| CN | 105678055 | A | | 6/2016 |
| CN | 106168797 | A | | 11/2016 |
| CN | 106226055 | A | | 12/2016 |
| CN | 106503755 | A | | 3/2017 |
| CN | 107609325 | A | | 1/2018 |
| CN | 107679132 | A | | 2/2018 |
| CN | 108596511 | A | | 9/2018 |
| CN | 108876002 | A | | 11/2018 |
| CN | 109032109 | A | | 12/2018 |
| EP | 2472440 | A1 | | 7/2012 |
| EP | 3416013 | A1 | | 12/2018 |
| EP | 3570130 | A1 | | 11/2019 |
| EP | 3570130 | B1 | * 12/2020 | ......... G05B 19/4155 |

OTHER PUBLICATIONS

Kai Höfig, Marc Zeller, Francesco Montrone, and Stefan Rothbauer,"Loop Normalizing Algorithm"; Siemens AG, Corporate Technology, Otto-Hahn-Ring 6, 81739 Munchen, Germany {kai.hoefig,marc.zelle,francesco.montrone,stefan.rothbauer}@siemens.com http://www.siemens.com/.

Min, Fang et al:; "Variable sorting method of multi-valued decision diagram for fault tree structure adjustement".; May 23, 2017.
Ao, Yang: "Research on Plant-wide power outage accident and fault tree analysis method"; Jun. 16, 2019.
Cao Zhiqiang et al:; "An Automatic tree building method for complex system fault trees based on control flow"; Jul. 15, 2008.
Ho-Gon Lim et al.: "Systematic treatment of circular logics in a fault tree analysis", Nuclear Engineering and Design, vol. 245, pp. 172-179, XP028905343, Issn: 0029-5493, DOI:10.1016/J.NUCENGDES.2011.12.016, abstract, paragraph [03.2]; DOI: 10.1016/j.nucengdes.2011.12.016; Section 3: "Algorithm for automatic treatment of CLs", especially section 3.2:"An example of an algorithm"; 2011.
International Electrotechnical Commission (IEC) 61508, "Functional Safety of electrical/Electronic/Programmable Electronic Safety-related Systems," 1998.
Iverson D L: "Automatic translation of digraph to fault-tree models", Reliability and Maintainability Symposium, 1992. Proceedings., Annual Las Vegas, NV, USA Jan. 21-23, 1992, New York, NY, USA, IEEE, US, pp. 354-362, XP010058371, DOI: 10.1109/ARMS.1992.187848 ISBN: 978-0-7803-0521-2; 1992.
IEC 60812, "Analysis Techniques for System Reliability—Procedure forFailure Mode and Effects Analysis (FMEA)," 1991 (2006).
Vesely W E et al: "Fault Tree Handbook" US Nuclear Regulatory Commission (1981), NUREG-0492, Jan. 1981; 1981.
PCT International Search Report and Written Opinion of International Searching Authority mailed Oct. 21, 2020 corresponding to PCT International Application No. PCT/EP2020/069537 filed Jul. 10, 2020.

* cited by examiner

RING-CLOSURES IN FAULT TREES AND NORMALIZED REPRESENTATION

CROSS-REFERENCE TO RELATED APPLICATIONS

This application claims priority to PCT Application No. PCT/EP2020/069537, having a filing date of Jul. 10, 2020, which claims priority to EP Application No. 19185911.5 having a filing date of Jul. 12, 2019, the entire contents both of which are hereby incorporated by reference.

FIELD OF TECHNOLOGY

The following relates to modeling a multi-component control or actuator system using a fault tree. The following further relates to ring closures in the fault tree.

BACKGROUND

The importance of safety-critical systems in many application domains of embedded systems, such as aerospace, railway, health care, automotive and industrial automation is continuously growing. Thus, along with the growing system complexity, also the need for safety assurance as well as its effort is increasing in order to guarantee the high-quality demands in these application domains. The aim of safety assurance is to ensure that systems do not lead to hazardous situations which may harm people or endanger the environment. In the application domains of safety-critical systems, the safety assurance is defined by the standards, see, e.g., the International Electrotechnical Commission (IEC) 61508 "Functional safety of electrical/electronic/programmable electronic safety related systems" (1998).

Traditionally, the assessment of a system in terms of safety is based on a bottom-up safety analysis approach, such as Failure Mode and Effect Analysis (FMEA), see IEC 60812 "Analysis Techniques for System Reliability—Procedure for Failure Mode and Effects Analysis (FMEA)" (1991). Alternatively, the assessment of a system according to reference implementations is based on top-down approaches such as the Fault Tree (FT) Analysis (FTA), see, e.g., Vesely, W. E., Goldberg, F. F., Roberts, N. H., Haasl, D. F.: Fault Tree Handbook, US Nuclear Regulatory Commission (1981). By such techniques, it is possible to identify system failure states, their causes, and effects with impact on the system safety.

Often architectures of systems contain loops. An example for a loop is a closed loop controller. Closed-loop control refers to the process in which a physical variable, e. g., ambient temperature, is to be brought to a particular value while being stabilized against disturbances. A feedback-obtained based on measuring an observable indicative of the physical variable—is used to set operation of an actuator influencing the physical variable. The controller is the component that acquires the actual value and derives a control signal from the difference between the set point and actual value. The controller then activates a final controlling element, e. g., heater, that compensates for the control deviation.

Since failure propagation models often use Boolean logic, e.g., to drive a fault tree (FT), loops/ring closures are problematic. Because Boolean logic cannot contain loops in general, there are techniques to prevent loops in such models, e.g., as described in Kai Höfig, Joe Zhensheng Guo, and Amir Kazeminia. *Streamlining architectures for integrated safety analysis using design structure matrices (dsms)*. *Safety and Reliability: Methodology and Applications*, 2014. For applications where failure propagation models are composed automatically, e.g., when the architecture is generated, such preventive technologies cannot help. Such loops often cannot be prevented, they simply develop during the composition of a system from existing components and existing parts of failure propagation models. Therefore, a technique is required that is able to deal with loops in failure propagation models that use Boolean logic.

It has been observed that performing analysis for fault trees that include ring closures can be problematic. For example, sometimes it may not be possible to determine a minimal cutset of the fault tree if the fault tree includes ring closures. The minimal cutset analysis is described in *Loop Normalizing Algorithm*: Kai Höfig, Marc Zeller, Francesco Montrone, and Stefan Rothbauer.

SUMMARY

Therefore, a need exists for processing advanced techniques of analyzing safety-critical systems. In particular, a need exists for advanced techniques of handling FTs including ring closures.

A computer-implemented method includes modeling a multi-component control or actuator system using a FT. The FT includes a plurality of elements. The plurality of elements is associated with components of the system. The FT also includes a plurality of interconnections between elements of the plurality of elements. The plurality of interconnections are associated with functional dependencies between the components. The method further includes detecting one or more ring closures of the FT. The method also includes, for each one of the one or more ring closures: replacing, in the FT, at least one respective edge of the respective ring closure by a respective variable. By such replacement, a placeholder FT is obtained. Then, a normalized representation of the placeholder FT is determined.

A computer program product (non-transitory computer readable storage medium having instructions, which when executed by a processor, perform actions) includes program code that can be executed by at least one processor. Executing the program code causes the at least one processor to perform a method. The method includes modeling a multi-component control or actuator system using a FT. The FT includes a plurality of elements. The plurality of elements is associated with components of the system. The FT also includes a plurality of interconnections between elements of the plurality of elements. The plurality of interconnections are associated with functional dependencies between the components. The method further includes detecting one or more ring closures of the FT. The method also includes, for each one of the one or more ring closures: replacing, in the FT, at least one respective edge of the respective ring closure by a respective variable. By such replacement, a placeholder FT is obtained. Then, a normalized representation of the placeholder FT is determined.

A device includes a control circuitry. The control circuitry can execute program code. Executing the program code causes the control circuitry to perform a method. The method includes modeling a multi-component control or actuator system using a FT. The FT includes a plurality of elements. The plurality of elements is associated with components of the system. The FT also includes a plurality of interconnections between elements of the plurality of elements. The plurality of interconnections are associated with functional dependencies between the components. The method further includes detecting one or more ring closures of the FT. The method also includes, for each one of the one or more ring closures: replacing, in the FT, at least one respective edge of the respective ring closure by a respective variable. By such replacement, a placeholder FT is obtained. Then, a normalized representation of the placeholder FT is determined.

It is to be understood that the features mentioned above and those yet to be explained below may be used not only in the respective combinations indicated, but also in other combinations or in isolation without departing from the scope of embodiments of the invention.

BRIEF DESCRIPTION

Some of the embodiments will be described in detail, with references to the following Figures, wherein like designations denote like members, wherein.

DETAILED DESCRIPTION

In the following, embodiments of the invention will be described in detail with reference to the accompanying drawings. It is to be understood that the following description of embodiments is not to be taken in a limiting sense. The scope of embodiments of the invention are not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques for safety assurance are described. Safety assurance of multi-component systems such as actuator and control systems help to increase safety in operating such systems.

Hereinafter, techniques are described to reliably and computationally inexpensively analyze FTs including ring closures.

An FT includes elements (sometimes called nodes) and interconnections (sometimes called edges). An FT may have one or more inputs; and may have one or more outputs. The FT generally describes propagation of error states.

A ring closure (sometimes simply called loop) of an FT generally describes a scenario in which the input of an element of the FT depends on an output of the same element. As a general rule, the ring closure can include one or more interconnections of the FT and/or one or more elements of the FT. The ring closure can sometimes have multiple branches running in parallel.

As a general rule, various options are available to detect the ring closure. For example, a plurality of failure propagation paths may be back-traced from an output of the FT towards one or more inputs of the FT. Then, for each failure propagation path, a check can be made if the respective failure propagation path forms a ring closure. Another option for detecting ring closures includes attempting to determine a normalized representation of the FT including one or more ring closures by using a reference algorithm such as the minimum concept analysis (MCA). Then, if an error feedback of the reference algorithm is obtained, this may be indicative of the ring closure. Such techniques have been described in further detail in European patent application 18172377.6, the content of which is incorporated herein in its entirety.

Another option for detecting the ring closure includes executing a reference normalization algorithm, e.g., a MCA. Then, if the MCA yields an error feedback—e.g., because a certain element of the FT is processed twice—this may be identification of the ring closure.

Then, if a ring closure is detected, it may be possible to take an appropriate counter measure to mitigate negative effects of the ring closure on the safety assurance.

For example, the ring closure can be replaced by a predefined expression. The predefined expression may be selected from a plurality of candidate predefined expression. The predefined expression may not be derived from the architecture of the modeled system. Rather, the predefined expression may be a generic expression which avoids the ring closure and still, to some larger or smaller extent, appropriately models the failure behavior of the system. For example, the ring closure may be replaced by using one or more variables.

More specifically, it would be possible that for each one of one or more ring closures, at least one respective edge of the respective ring closure is replaced by a respective variable. The variable can serve as a placeholder for the respective ring closure. By such replacement, a placeholder FT is obtained. The placeholder FT, per se, can be free of ring closures (because the ring closures are masked by the variables). Then, it would be possible to determine a normalized representation of the placeholder FT. This is because pre-defined algorithms—e.g., a MCA— may not yield errors for the placeholder FT than is free from ring closures.

As a general rule, various normalized representations could be used. Normalized representations can offer the benefit of a reduced complexity of the Boolean dependencies modeled by the FT. In particular, normalized representations may not include or only include to a limited degree redundancies between multiple Boolean expressions. For example, multiple redundant error propagation paths may be combined into a single path. Alternatively, or additionally, normalized representations may provide a predefined number of edges of the FT from input to output. Example normalized representations include a disjunctive normalized form in a conjunctive normalized form. For example, in the disjunctive normalized form, an OR-combination of multiple input branches may be considered, wherein each input branch is a and-combination of one or more input elements of the FT. Another example normalized representation is a Karnaugh-Veitch diagram or an output of a Quine-McCluskey method.

Generally, the techniques described herein may find application in various kinds and types of safety-critical systems. For example, the techniques described herein may find application in multi-component control or actuator systems. Such control or actuator systems may provide control functionality or activation functionality for certain machines. Some elements of multi-component safety-critical systems may be implemented as hardware while some components may alternatively or additionally be implemented using software. It is possible that the safety-critical systems for which the techniques are employed include an output which provides an actuator force or a control signal for actuating or controlling one or more machines. Specific examples of safety-critical systems which may benefit from the techniques described herein include, but are not limited to: electronic circuitry including active and/or passive electronic components such as transistors, coils, capacitors, resistors, etc.; drivetrains for vehicles such as trains or passenger cars or airplanes; assembly lines including conveyor belts, robots, movable parts, control sections, test sections for inspecting manufactured goods (backend testing); medical systems such as imaging systems including magnetic resonance imaging or computer tomography, particle therapy systems; power plants; etc.

Figure 1:
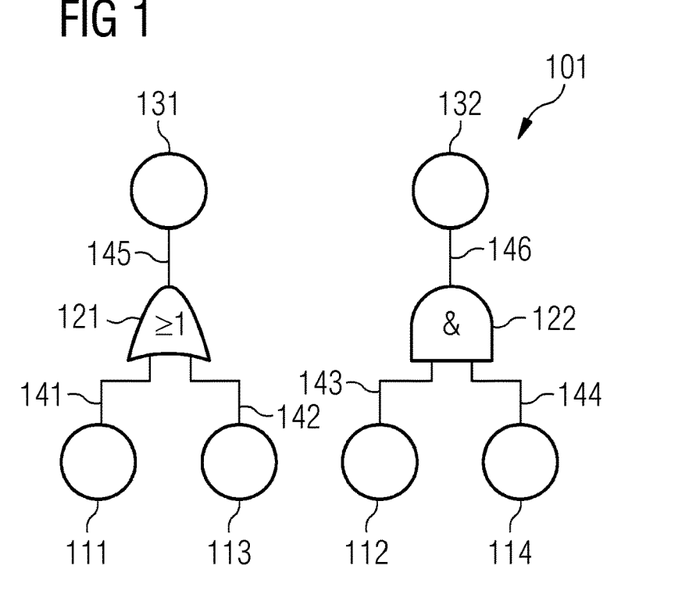
FIG. 1 is a schematic illustration of a FT according to various examples.

FIG. 1 illustrates aspects with respect to an FT 101. Details of the concept of FTs 101 are described, e.g., in Vesely, W. E., Goldberg, F. F., Roberts, N. H., Haasl, D. F.: "FT Handbook" US Nuclear Regulatory Commission (1981). The FT 101 can be used to model the failure behavior of a system in the various examples described herein. The FT 101, thus, may facilitate safety assurance. The failure behavior may be used in order to test whether the system may operate safely. The failure behavior may be used in order to identify drawbacks of the design of a system.

The FT 101 is implemented by a graph including nodes (illustrated in FIG. 1 by the geometrical shapes) and edges (illustrated in FIG. 1 by the lines between geometrical shapes).

As illustrated in FIG. 1, the FT 101 includes nodes 111-114 that define an input.

For example, nodes 111-112 may model basic events. The basic events may correspond to operational failure events, i.e., may take a logical TRUE or logical FALSE depending on whether there is a failure event. An operational failure event may correspond to some defect of the operation of the system which is modeled by the FT 101. For example, an operational failure event may correspond to the malfunctioning of an electronic components such as a resistor or a switch. For example, an operational failure event may correspond to the malfunctioning of a valve such as a pressure release valve, etc. For example, an operational failure event may correspond to malfunctioning of a cooling system. There are numerous possibilities of the kind and type of malfunction modeled by the operational failure event; the given examples are only illustrative examples and a wide variety of different kinds and types of operational failure events are conceivable.

The nodes 113, 114 may form input ports that receive a failure state from one or more further nodes of a further FT (not illustrated in FIG. 1).

The FT 101 also includes nodes 121, 122 defining Boolean operators. Boolean operator of node 121 is implemented as a logical OR combination of the states of the node 111 and the node 113; while Boolean operator of node 122 is implemented as a logical AND combination of the states of the node 112 and the node 114. Besides AND and OR operations, other operations are possible such as NAND or XOR.

The FT 101 also includes nodes 131, 132 that define outputs.

The nodes of the FT 101 are connected by edges 141-146.

Based on the FT 101, it is possible to model the failure propagation path of a failure event, e.g., of the operational failure events associated with one or more of the nodes 111 and 112. In particular, it can be checked whether the failure propagation path of the failure event influences the state of one or more top nodes 131, 132, i.e., the outputs of the FT 101.

The FT 101 in the example of FIG. 1 is free from ring closures. I.e., the input of none of the elements 111-116 of the FT 101 is affected by the output of the respective element 111-116. In other examples, the FT may include a ring closure. Such a scenario is illustrated in FIG. 2.

Figure 2:
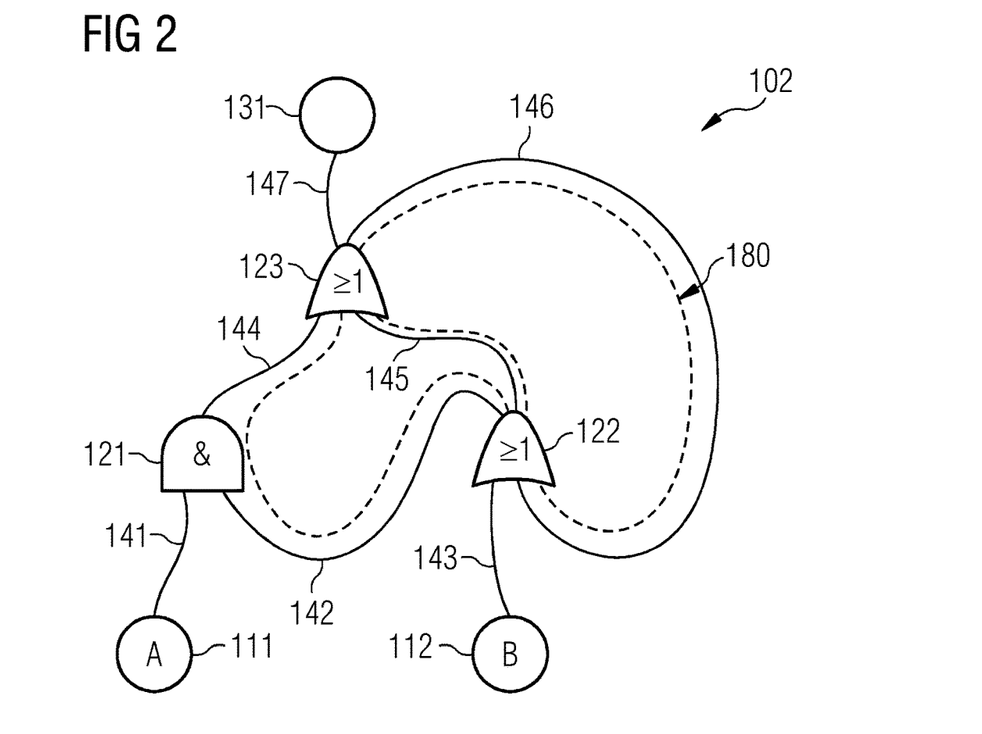
FIG. 2 is a schematic illustration of a FT including a ring closure according to various examples.

FIG. 2 illustrates aspects with respect to an FT 102. In the scenario of FIG. 2, the FT 102 includes the nodes 111-112 defining an input (labeled A and B in FIG. 2). The FT 102 includes the nodes 121-123 implementing Boolean operators and the top-level node 131 interconnected with the nodes 111-112 via the Boolean operators 121-123. As illustrated in FIG. 2, the FT 102 includes a ring closure 180 (dashed line), because the input to the Boolean operator 122 also depends on the output of the Boolean operator 122. In the example of FIG. 2, the ring closure 180 includes two branches (ex-node 122 to node 121, or ex node 122 to node 123); but may generally include more or fewer ring closures.

Figure 3:
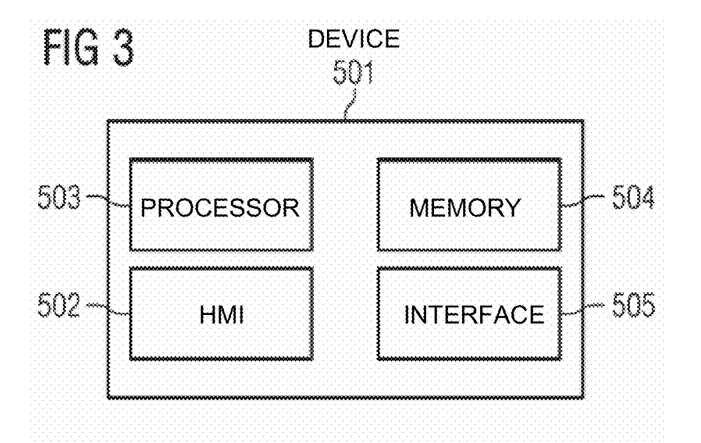
FIG. 3 is a schematic illustration of a device according to various examples.

FIG. 3 illustrates aspects with respect to a device 501.

The device 501 includes a human machine interface (HMI) 502. For example, the HMI may be configured to receive information from a user and/or to output information to a user. For example, the HMI may include one or more of the following: a keyboard; a mouse; loudspeakers; voice control; a monitor; etc. The HMI 502 is optional.

The device 501 further includes a processor 503, e.g., a multicore processor. The processor 503 is configured to receive program code from a memory 504, e.g., a non-volatile memory. The processor 503 and the memory 504 form a control circuitry. The processor 503 is configured to execute the program code. Executing the program code can cause the processor 503 to perform techniques as described herein, e.g., with respect to: modeling a multi-component control or actuator system using an FT; detecting ring closures in an FT e.g., by back-tracing failure propagation paths of the FT; replacing ring closures by a predefined expression such as a variable, to obtain a placeholder FT; applying one or more algorithms to determine a normalized representation of an FT or a placeholder FT; etc.

The device 501 further includes an interface 505. For example, control data may be output via the interface 505. For example, it may be possible to control the operation of a multi-component control or actuator system by control data which is transmitted via the interface 505. The interface 505 is optional.

Figure 4:
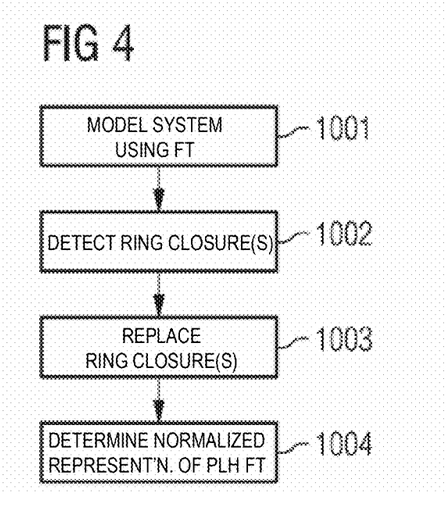
FIG. 4 is a schematic illustration of a method according to various examples.

FIG. 4 is a flowchart of a method according to various examples. For example, the method according to the flowchart of FIG. 4 may be executed by the processor 503 of the device 501.

In box 1001, a system—such as a multi-component control or actuator system or another type of system which includes hardware and/or software components—is modeled using an FT. The FT may be defined by a graph including nodes and edges. Some of the nodes may correspond to basic events of the FT; other nodes implement Boolean logic. The edges define interdependencies between the components of the system, e.g., by defining failure propagation, etc.

Operational failure events associated with malfunctioning of one or more components of the system are defined within the FT. This may include assigning operational failure events to at least some nodes of a plurality of nodes of the FT.

Next, in box 1002, one or more ring closures are detected. This may include back-tracing failure propagation paths from an output of the FT towards one or more inputs of the FT. Hence, the failure propagation paths may be followed from top level to bottom level of the FT. This may be implemented iteratively, by iteratively expanding links towards the root of the FT, i.e., towards one or more inputs of the FT. Then it can be checked for the various failure propagation paths if the respective failure propagation path forms a ring closure.

If a ring closure is not identified, then no action needs to be taken.

If a ring closure is identified, the ring closure is temporarily replaced by a placeholder. This is achieved by replacing the ring closure with a variable, at box 1003. In detail, if one or more ring closures are detected, then, in box 1003, for each one of the detected one or more ring closures, at least one respective edge of the respective ring closure is replaced by a respective variable. This provides a placeholder FT.

Then, in box 1004, a normalized representation of the placeholder FT is determined.

The normalized representation can ease analysis and further processing. For example, certain analysis tasks such as detecting a primary cause of error, determining fault probabilities, determining fault interdependencies, etc. may be efficiently implemented based on the normalized representation.

Next, in connection with FIG. 5, details of box 1003, i.e., replacing at least one respective edge of the respective ring closure by a respective variable will be explained.

Figure 5:
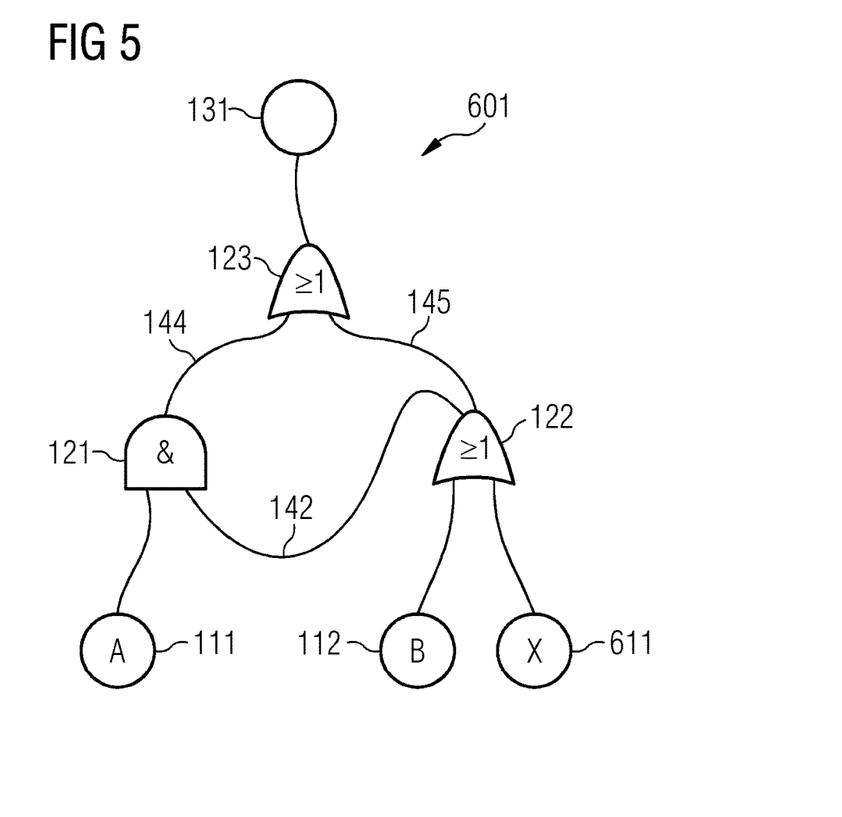
FIG. 5 schematically illustrates a placeholder FT associated with the FT of FIG. 2 according to various examples.

FIG. 5 illustrates aspects of a placeholder FT 601. The placeholder FT 601 according to FIG. 5 is obtained based on the FT 102. The placeholder FT 601 eases determining of a normalized representation using reference algorithms, e.g., a cutset analysis, etc.

In the scenario of FIG. 5, the edge 146 (cf. FIG. 2) connecting the output of the node 123 with the input of the node 122 of the FT 102 has been replaced by the variable 611 (labeled "X" in FIG. 5).

As explained above in connection with FIG. 2, the ring closure 180 includes multiple branches and edges 142, 144, 145-146. In the example of FIG. 5, only the edge 146 is replaced by the variable 611; but the edges 142, 144-145 are not replaced. The edge 146 prevents decision-making of the FT 102: i.e., the edge 146 is the last edge of the ring closure 180 leading to the input of the node 122 forming the Boolean logic having an input that also depends on its output. I.e., the edge 146 is the last edge leading towards the node 122 forming the origin of the ring closure. On the other hand, the other edges 142, 144-145 do not affect the ability to make a decision based on the FT 102 and thus do not need to be replaced. The edges 142, 144-145 are not the last edges of the ring closure 180.

Next, details with respect to box 1004 will be explained. Box 1004 operates based on the placeholder FT 601. In box 1004, the normalized representation of the placeholder FT 601 is determined. This can include determining cutsets of the placeholder FT. Determining cutsets of the placeholder FT is illustrated in TABLE 1.

TABLE 1

| Cutset analysis of placeholder FT 601 | | | | | |
|---|---|---|---|---|---|
| A | B | $X_1$ | Result | Cutset | Minimal |
| 0 | 0 | 0 | 0 | | |
| 0 | 0 | 1 | 1 | X | X |
| 0 | 1 | 0 | 1 | X | X |
| 0 | 1 | 1 | 1 | X | |
| 1 | 0 | 0 | 0 | | |
| 1 | 0 | 1 | 1 | X | |
| 1 | 1 | 1 | 1 | X | |
| 1 | 1 | 1 | 1 | X | |

As illustrated in FIG. 1, a cutset is defined by the node 131 of the placeholder FT 601 taking a true value (="1" in TABLE 1). In TABLE 1, also the minimal cutsets are illustrated, but generally it is not required to determine the minimal cutset.

Figure 6:
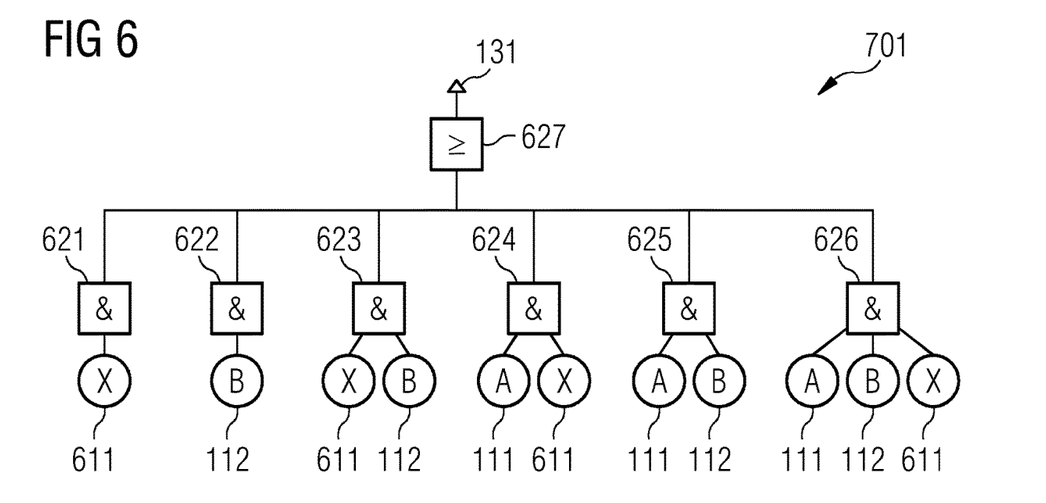
FIG. 6 schematically illustrates a disjunctive normalized graph associated with a cutset of the placeholder FT of FIG. 5 according to various examples.

Then, it is possible to transform the cutsets into a disjunctive normalized graph. Such a disjunctive normalized graph 701 is illustrated in FIG. 6. The logic of the disjunctive normalized graph 701 corresponds to the logic of the placeholder FT 601. The disjunctive normalized graph includes a single node 627 modeling the Boolean OR-logic and multiple branches forming inputs to the node 627, wherein each branch has a respective node 621-626 modeling a Boolean AND-logic. The inputs to each branch correspond to the cut sets according to TABLE 1.

As a general rule, other normalized graphs are available, e.g., a conjunctive normalized graph.

Figure 7:
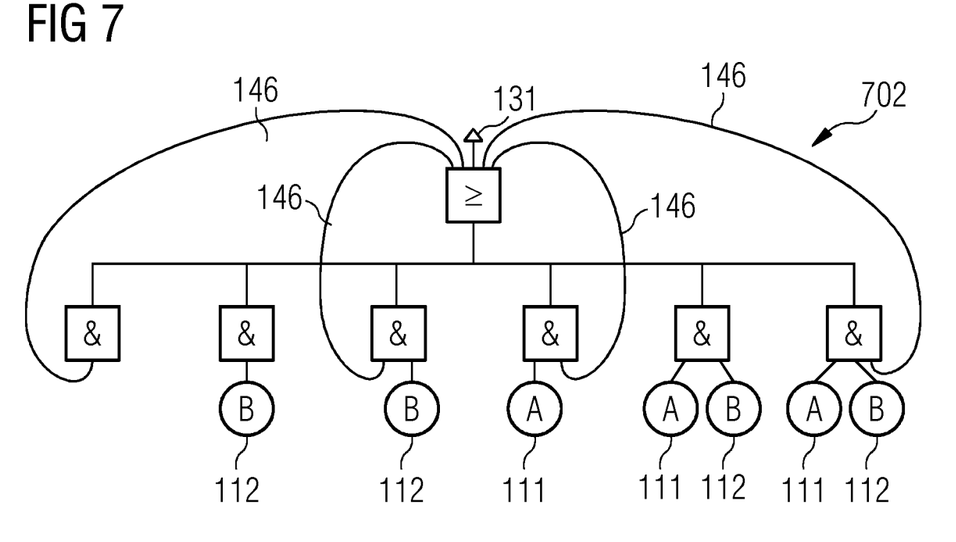
FIG. 7 schematically illustrates a disjunctive normalized graph associated with the FT of FIG. 2 according to various examples.

It is then possible, in the normalized representation of the placeholder FT 601, e.g., the disjunctive normalized graph 701 according to FIG. 6, to replace, for each one of the one or more ring closures 180, each respective variable by the respective edge, to thereby obtain a normalized representation of the original FT 102 including the ring closure 180. This is illustrated in FIG. 7. FIG. 7 illustrates the disjunctive normalized graph 702 corresponding to the disjunctive normalized graph 701 of FIG. 6 but including the edge 146.

The disjunctive normalized graph 702 of the FT 102 can then be used in connection with various analysis methods. Examples would include determining a Karnaugh-Veitch diagram or an output of a Quine-McCluskey method.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method, said method comprising:
analyzing a safety-critical system to detect a primary cause of error, determine fault probabilities, and/or determine fault interdependencies, wherein the safety-critical system is a multi-component control or actuator system, wherein prior to analyzing, one or more ring closures are replaced by:
modeling the multi-component control or actuator system using a fault tree, the fault tree comprising a plurality of nodes associated with components of the system, and a plurality of edges between nodes of the plurality of nodes associated with functional dependencies between the components, detecting one or more ring closures of the fault tree, and for each one of the one or more ring closures: taking an appropriate counter measure to mitigate negative effects of the ring closure on safety assurance, including, replacing, in the fault tree, at least one respective edge of the respective ring closure by a respective variable, to obtain a placeholder fault tree, and determining a normalized representation of the placeholder fault tree, and wherein the detecting of the one or more ring closures comprises one or more of: back-tracing a plurality of failure propagation paths from an output of the fault tree towards one or more inputs of the fault tree; for each one of the plurality of failure propagation paths: checking if the respective failure propagation path forms a ring closure and, in the affirmative, replacing the ring closure by a predefined expression; and attempting to determine a normalized representation of the fault tree using a reference algorithm and obtaining an error feedback of the reference algorithm, wherein the output of the fault tree provides an actuator force or a control signal;

actuating or controlling one or more machines, using the actuator force or the control signal, respectively, in application to the safety-critical system, wherein the safety-critical system comprises electronic circuitry having one or more electronic components, a drivetrain for a vehicle, an assembly line having one or more assembly-line components, a medical system, a power plant, or combinations thereof, wherein the one or more electronic components comprise a transistor, a coil, a capacitor, a resistor, or combinations thereof, wherein the one or more assembly-line components comprise a conveyor belt, a robot, a movable part, a control section, a test section for inspecting manufactured goods, or combinations thereof, and wherein the medical system comprises an imaging system, a magnetic resonance imaging system, a computer tomography system, a particle therapy system, or combinations thereof.

2. The method of claim 1, wherein the determining of the normalized representation of the placeholder fault tree comprises:

determining cutsets of the placeholder fault tree, and determining a disjunctive normalized graph or a conjunctive normalized graph based on the cutsets as the normalized representation.

3. The method of claim 1, said method further comprising:

for each one of the one or more ring closures: replacing, in the normalized representation of the placeholder fault tree, each respective variable by the at least one respective edge, to obtain the normalized representation of the fault tree.

4. The method of claim 1, wherein the multi-component control or actuator system comprises a closed-loop control circuitry associated with a ring closure of the fault tree.

5. A computer program product comprising a computer readable storage medium storing program code that is executable by at least one processor, wherein when the at least one processor executes the program code the at least one processor performs the method of claim 1.

6. The method of claim 1, wherein the reference algorithm comprises a minimum concept analysis.

7. A device comprising control circuitry configured to:

model a multi-component control or actuator system of a safety-critical system using a fault tree, the fault tree comprising a plurality of nodes associated with components of the system, and a plurality of edges between nodes of the plurality of nodes associated with functional dependencies between the components, detect one or more ring closures of the fault tree, for each one of the one or more ring closures: replace, in the fault tree, at least one respective edge of the respective ring closure by a respective variable to obtain a placeholder fault tree, and determine a normalized representation of the placeholder fault tree, analyze the safety-critical system to detect a primary cause of error, determine fault probabilities, and/or determine fault interdependencies, and control operation of the multi-component control or actuator system using control data, wherein the control circuitry being configured to detect the one or more ring closures comprises the control circuitry being configured for one or more of: back-tracing a plurality of failure propagation paths from an output of the fault tree towards one or more inputs of the fault tree; and attempting to determine a normalized representation of the fault tree using a reference algorithm and obtaining an error feedback of the reference algorithm, wherein the output of the fault tree provides an actuator force or a control signal;

actuate or control one or more machines, using the actuator force or the control signal, respectively, in application to the safety-critical system, wherein the safety-critical system comprises electronic circuitry having one or more electronic components, a drivetrain for a vehicle, an assembly line having one or more assembly-line components, a medical system, a power plant, or combinations thereof, wherein the one or more electronic components comprise a transistor, a coil, a capacitor, a resistor, or combinations thereof, wherein the one or more assembly-line components comprise a conveyor belt, a robot, a movable part, a control section, a test section for inspecting manufactured goods, or combinations thereof, and wherein the medical system comprises an imaging system, a magnetic resonance imaging system, a computer tomography system, a particle therapy system, or combinations thereof.

* * * * *